(No Model.)

S. H. BRITTON.
CANDY.

No. 294,575. Patented Mar. 4, 1884.

Witnesses
James R. Bowen.
T. A. Keane

Inventor
Samuel H. Britton,
by his attorneys
Gifford & Brown

United States Patent Office.

SAMUEL H. BRITTON, OF HOBOKEN, NEW JERSEY, ASSIGNOR TO ALBERT GREEN AND WILLIS B. BLACKWELL, BOTH OF NEW YORK, N. Y.

CANDY.

SPECIFICATION forming part of Letters Patent No. 294,575, dated March 4, 1884.

Application filed January 26, 1884. (No model.)

*To all whom it may concern:*

Be it known that I, SAMUEL H. BRITTON, of Hoboken, in the county of Hudson and State of New Jersey, have invented a certain new and useful Improvement in Eggs Made of Candy, of which the following is a specification.

My improvement consists in an egg or egg-shaped candy, consisting in a box shaped like an egg, and an external shell or casing of candy.

Figure 1:
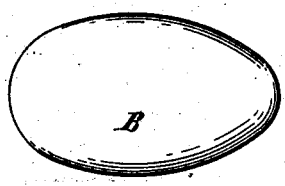
Figure 2:
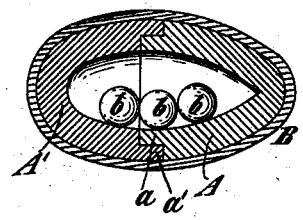
Figure 3:
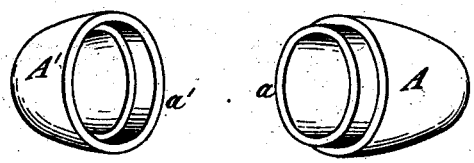

In the accompanying drawings, Figure 1 is an external view of an egg or egg-shaped candy embodying my improvement. Fig. 2 is a central section of the same, and Fig. 3 is a perspective view of the box of the same, with the cover detached.

Similar letters of reference designate corresponding parts in all the figures.

A A' designate a box made of wood or other suitable material. This box consists of a body, A, provided with a circular flange, $a$, at the mouth, and a cover, A', provided at the edge with a lip, $a'$, adapted to surround the flange $a$ of the body when the cover is applied to the body. This box is shaped like the shell of an egg.

The box which I have described may be filled with small candies $b$, or it may have in it a few such candies, as shown, so that when shaken these candies will produce a rattling noise.

Enveloping the box A A' is a shell or casing, B, of candy. This shell or casing B may be made of any suitable kind of candy, and it completely incloses the box, thereby retaining the cover of the box on the body. In order to cover the box with the shell or casing of candy, I apply to the exterior of the box, after its cover has been put in its place, a coating of any suitable mucilaginous substance—as, for instance, a solution of gum-arabic. This may be done by rolling it in such substance, or by applying the substance with a brush or other suitable device. After the coating of mucilaginous substance is applied to the box, it may be rolled in a rotary kettle, into which is introduced the candy-liquid of which the shell or casing is to be formed. The candy-liquid will be introduced into the kettle in small quantities from time to time, and it will be dried on by heat from steam circulating in an external jacket, or in a coil, or by other agency, each quantity of the candy-liquid introduced forming a thin film around the box, and being dried thereon before a successive quantity of the candy-liquid is introduced.

The casing or shell of candy may be broken off by the teeth or otherwise, and then the cover of the box may be taken off and access gained to the candies within the box.

By my invention I attain many advantages. The use of the box enables me to make for a given price a larger candy representing a larger egg than could be made without it. The box serves as a form around which the candy casing or shell may be formed, so as to produce a more perfect representation of an egg than could be made according to the common method of manufacturing such candies. The rattling noise which may be produced by shaking the candy egg made according to my invention will be fraught with mystery, and hence afford amusement. Not only does the box serve as a form around which the candy casing or shell may be formed easily, but the candy casing or shell will serve to retain the cover of the box on the body.

What I claim as my invention, and desire to secure by Letters Patent, is—

1. An egg or egg-shaped candy consisting of a box having a cover detachable from the body, and a casing or shell of candy enveloping the box, substantially as specified.

2. An egg or egg-shaped candy consisting of a box containing small candies and enveloped in a shell or casing of candy, substantially as specified.

SAMUEL H. BRITTON.

Witnesses:
THOS. F. BARRY,
FRANK R. BUCK.